(12) United States Patent
Choi et al.

(10) Patent No.: US 10,182,440 B2
(45) Date of Patent: Jan. 15, 2019

(54) METHOD FOR TRANSMITTING DATA USING PLURALITY OF SUBBANDS AND APPARATUS USING SAME

(71) Applicant: LG ELECTRONICS INC., Seoul (KR)

(72) Inventors: Jinsoo Choi, Seoul (KR); Wookbong Lee, Seoul (KR); Hangyu Cho, Seoul (KR); Jinyoung Chun, Seoul (KR); Dongguk Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 56 days.

(21) Appl. No.: 15/306,744

(22) PCT Filed: Jun. 9, 2015

(86) PCT No.: PCT/KR2015/005788
§ 371 (c)(1),
(2) Date: Oct. 25, 2016

(87) PCT Pub. No.: WO2015/190806
PCT Pub. Date: Dec. 17, 2015

(65) Prior Publication Data
US 2017/0048865 A1    Feb. 16, 2017

Related U.S. Application Data

(60) Provisional application No. 62/009,872, filed on Jun. 9, 2014, provisional application No. 62/010,411, filed on Jun. 10, 2014.

(51) Int. Cl.
*H04W 72/04*     (2009.01)
*H04L 27/26*     (2006.01)
*H04L 5/00*      (2006.01)

(52) U.S. Cl.
CPC ....... *H04W 72/0453* (2013.01); *H04L 5/0044* (2013.01); *H04L 5/0053* (2013.01);
(Continued)

(58) Field of Classification Search
None
See application file for complete search history.

(56) References Cited

U.S. PATENT DOCUMENTS

| 2004/0130487 A1* | 7/2004 | Hoffmann | H01Q 1/1257 342/359 |
| 2006/0182017 A1* | 8/2006 | Hansen | H04B 7/02 370/208 |

(Continued)

FOREIGN PATENT DOCUMENTS

| WO | 2010120692 | 10/2010 |
| WO | 2013077600 A1 | 5/2013 |
| WO | 2013077652 A1 | 5/2013 |

OTHER PUBLICATIONS

PCT International Search Report, Applicant's or agent's file reference: BPP2015-0118 ,International application No. PCT/KR2015/005788, International filing date: Jun. 9, 2015 (Jun. 9, 2015), Priority date: Jun. 9, 2014 (Jun. 9, 2014), LG Electronics Inc.*

(Continued)

*Primary Examiner* — Hassan A Phillips
*Assistant Examiner* — Gautam Sharma
(74) *Attorney, Agent, or Firm* — Lee, Hong, Degerman, Kang & Waimey

(57) ABSTRACT

Provided are a method and an apparatus for transmitting data in a wireless LAN. A transmitter receives, from an access point (AP), allocation information about at least one subband from among a plurality of subbands, and transmits a physical layer protocol data unit (PPDU) in the at least one (Continued)

allocated subband. A guard area is defined on both ends of at least any one of the plurality of subbands.

12 Claims, 14 Drawing Sheets

(52) U.S. Cl.
CPC ........ *H04L 5/0064* (2013.01); *H04L 27/2602* (2013.01); *H04L 27/2607* (2013.01); *H04L 5/0023* (2013.01); *H04L 5/0066* (2013.01)

(56) References Cited

U.S. PATENT DOCUMENTS

| | | |
|---|---|---|
| 2010/0273497 A1 | 10/2010 | Cho et al. |
| 2012/0213181 A1 | 8/2012 | Walton et al. |
| 2013/0242916 A1 | 9/2013 | Meylan et al. |
| 2015/0023272 A1* | 1/2015 | Choi .................. H04L 27/2613 370/329 |
| 2015/0146653 A1* | 5/2015 | Zhang .................. H04L 5/0041 370/329 |
| 2015/0173070 A1* | 6/2015 | Aboul-Magd ........ H04L 5/0007 370/329 |
| 2016/0072654 A1* | 3/2016 | Choi .................. H04L 27/2602 370/329 |

OTHER PUBLICATIONS

Korean Intellectual Property Office Application No. 10-2016-7025987, Office Action dated Feb. 26, 2018, 5 pages.
IEEE Computer Society, et al., "IEEE Standard for Local and metropolitan area networks Part 16: Air Interface for Fixed and Mobile Broadband Wireless Access Systems", IEEE Std 802.16e-2005 and IEEE Std 802.16-2004/Cor1-2005, Feb. 2006, 864 pages.

* cited by examiner

FIG. 4

| | | | | | | | | |
|---|---|---|---|---|---|---|---|---|
| L-STF | L-LTF | L-SIG | HE-SIG A | HE-SIG B | HE-STF | HE-LTF | Data for STA1 |
| L-STF | L-LTF | L-SIG | HE-SIG A | | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

20MHz channel

METHOD FOR TRANSMITTING DATA USING PLURALITY OF SUBBANDS AND APPARATUS USING SAME

CROSS-REFERENCE TO RELATED APPLICATIONS

This application is the National Stage filing under 35 U.S.C. 371 of International Application No. PCT/KR2015/005788, filed on Jun. 9, 2015, which claims the benefit of U.S. Provisional Application Nos. 62/009,872, filed on Jun. 9, 2014 and 62/010,411, filed on Jun. 10, 2014, the contents of which are all hereby incorporated by reference herein in their entirety.

BACKGROUND OF THE INVENTION

Field of the Invention

This specification relates to wireless communication and, most particularly, to a method for transmitting data using a plurality of subbands and an apparatus using the same in a wireless LAN (wireless local area network, WLAN).

Related Art

The Wi-Fi is a Wireless Local Area Network (WLAN) technology that enables a device to be connected to the Internet in a frequency band of 2.4 GHz, 5 GHz or 60 GHz. A WLAN is based on Institute of Electrical and Electronics Engineers (IEEE) 802.11 standard.

The IEEE 802.11n standard supports multiple antennas and provides a maximum data rate of 600 Mbits/s. A system that supports the IEEE 802.11n standard is called a High Throughput (HT) system.

The IEEE 802.11ac standard mostly operates in a 5 GHz band and provides a data rate of 1 Gbit/s or more. IEEE 802.11ac supports downlink Multi-User Multiple Input Multiple Output (MU-MIMO). A system that supports IEEE 802.11ac is called a Very High Throughput (VHT) system.

A IEEE 802.11ax is being developed as a next-generation WLAN for handling a higher data rate and a higher user load. The scope of IEEE 802.11ax may include 1) the improvements of the 802.11 physical (PHY) layer and the Medium Access Control (MAC) layer, 2) the improvements of spectrum efficiency and area throughput, 3) performance improvement in an environment under an interference source, a crowded heterogeneous network environment, and an environment having heavy user load.

The conventional IEEE 802.11 standard supports only Orthogonal Frequency Division Multiplexing (OFDM). In contrast, in a next-generation WLAN, supporting Orthogonal Frequency Division Multiple Access (OFDMA) capable of multi-user access is being taken into consideration.

SUMMARY OF THE INVENTION

Technical Objects

This specification provides a method for transmitting data using a plurality of subbands and an apparatus using the same in a wireless LAN.

Technical Solutions

According to one aspect, a method for transmitting data in a wireless LAN is provided. The method includes receiving by a transmitter allocation information respective to at least one of a plurality of subbands from an AP (access point), and transmitting by the transmitter a PPDU (Physical layer Protocol Data Unit) from the at least one allocated subband. At least any one of the plurality of subbands has guard regions defined at both end of the corresponding subband.

Each of the plurality of subbands may have guard regions defined at both ends of the corresponding subband.

A number of guard subcarriers being included in the guard region may vary in accordance with a FFT (fast Fourier transform) size that is used for the generation of the PPDU.

According to another aspect, an apparatus for transmitting data in a wireless LAN includes a transceiver transmitting and receiving radio signals, and a processor being connected to the transceiver. The processor is configured to receive allocation information respective to at least one of a plurality of subbands from an AP (access point) through the transceiver, and to transmit a PPDU (Physical layer Protocol Data Unit) from the at least one allocated subband through the transceiver. At least any one of the plurality of subbands has guard regions defined at both end of the corresponding subband.

Effects of the Invention

In a situation where stations having different bandwidths co-exist, interference may be mitigated (or alleviated), and system performance may be enhanced.

BRIEF DESCRIPTION OF THE DRAWINGS

FIG. 4 illustrates yet another example of a proposed PPDU format for a WLAN.

DESCRIPTION OF EXEMPLARY EMBODIMENTS

For clarity, a Wireless Local Area Network (WLAN) system in accordance with the Institute of Electrical and Electronics Engineers (IEEE) 802.11n standard is called a High Throughput (HT) system, and a system in accordance with the IEEE 802.11ac standard is called a Very High Throughput (VHT) system. A WLAN system in accordance with proposed methods is called a High Efficiency WLAN (HEW) system or a High Efficiency (HE) system. The term "HEW" or "HE" is used to distinguish it from a conventional WLAN, and any restriction is not imposed on the term.

A proposed WLAN system may operate in a frequency band of 6 GHz or less or a frequency band of 60 GHz. The frequency band of 6 GHz or less may include at least one of a 2.4 GHz band and a 5 GHz band.

A station (STA) may be called various names, such as a wireless device, a Mobile Station (MS), a network interface device, and a wireless interface device. An STA may include a non-AP STA or an Access Point (AP) unless the function of the STA is separately distinguished from that of an AP. When it is said that communication is performed between an STA and an AP, the STA may be construed as being a non-AP STA. When it is said that communication is performed between an STA and an AP or the function of an AP is not separately required, an STA may be a non-AP STA or an AP.

A Physical layer Protocol Data Unit (PPDU) is a data block that is generated in the physical (PHY) layer in IEEE 802.11 standard.

Figure 1:
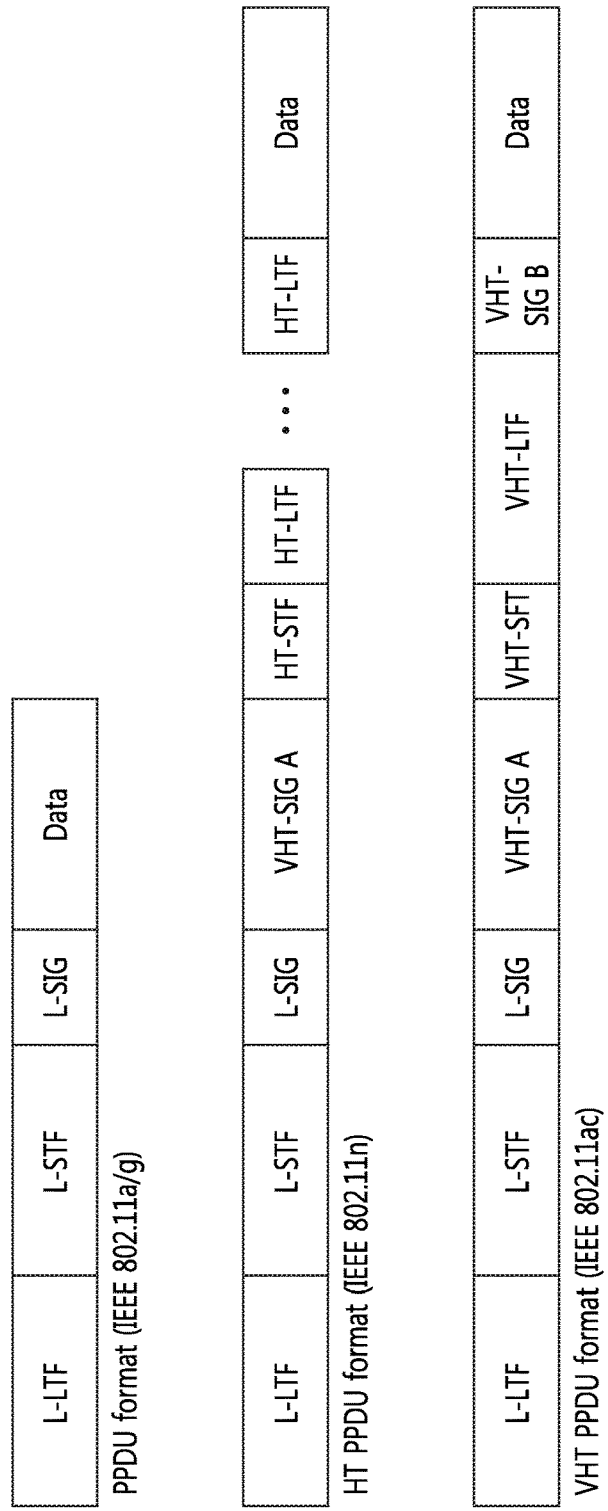
FIG. 1 illustrates a conventional PPDU format.

FIG. 1 illustrates a conventional PPDU format.

A PPDU supporting IEEE 802.11a/g includes a Legacy-Short Training Field (L-STF), a Legacy-Long Training Field (L-LTF), and a legacy-signal (L-SIG). The L-STF may be used for frame detection, Automatic Gain Control (AGC), etc. The L-LTF may be used for fine frequency/time synchronization and channel estimation.

An HT PPDU supporting IEEE 802.11n includes a VHT-SIG, an HT-STF, and HT-LTFs which are sequentially subsequent to an L-SIG.

A VHT PPDU supporting IEEE 802.11ac includes a VHT-SIG A, a VHT-STF, a VHT-LTF, and a VHT-SIG B which are sequentially subsequent to an L-SIG.

Figure 2:
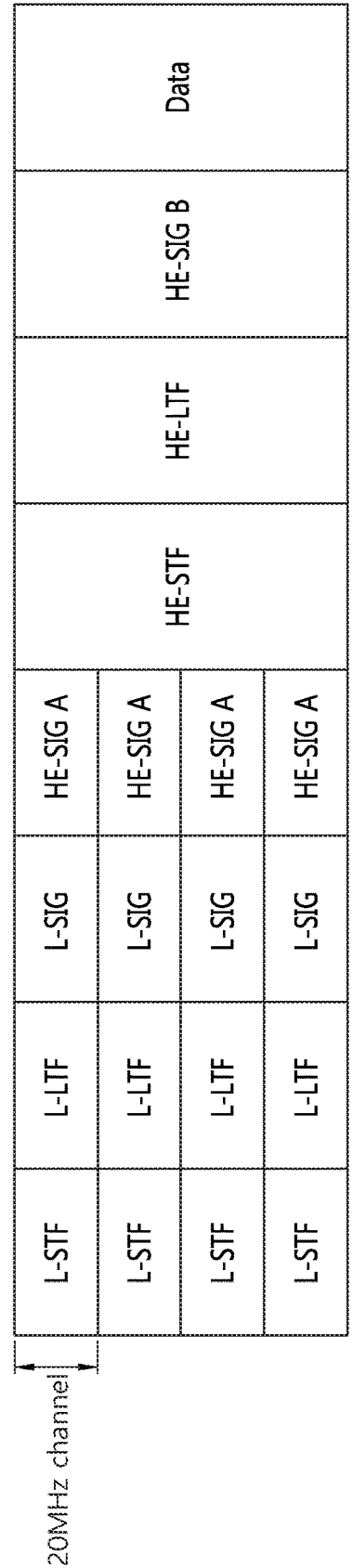
FIG. 2 illustrates an example of a proposed PPDU format for a WLAN.

FIG. 2 illustrates an example of a proposed PPDU format for a WLAN.

FIG. 2 illustrates the PPDU that is transmitted in a total of an 80-MHz bandwidth through four 20 MHz channels. The PPDU may be transmitted through at least one 20 MHz channel. FIG. 2 illustrates an example in which an 80-MHz band has been allocated to a single reception STA. The four 20 MHz channels may be allocated to different reception STAs.

An L-STF, an L-LTF, and an L-SIG may be the same as the L-STF, L-LTF, and L-SIG of a VHT PPDU. The L-STF, the L-LTF, and the L-SIG may be transmitted in an Orthogonal Frequency Division Multiplexing (OFDM) symbol generated based on 64 Fast Fourier Transform (FFT) points (or 64 subcarriers) in each 20 MHz channel.

An HE-SIG A may include common control information that is in common received by STAs receiving a PPDU. The HE-SIG A may be transmitted in two or three OFDM symbols.

The following table illustrates information included in the HE-SIG A. The names of fields or the number of bits is only illustrative, and all the fields are not essential.

TABLE 1

| FIELD | BIT | DESCRIPTION |
| --- | --- | --- |
| Bandwidth | 2 | Indicating a bandwidth in which a PPDU is transmitted. For example, 20 MHz, 40 MHz, 80 MHz or 160 MHz |

TABLE 1-continued

| FIELD | BIT | DESCRIPTION |
| --- | --- | --- |
| Group ID | 6 | Indicating an STA or a group of STAs that will receive a PPDU |
| Stream information | 12 | Indicating the number or location of spatial streams for each STA, or the number or location of spatial streams for a group of STAs |
| Uplink (UL) indication | 1 | Indicating whether a PPDU is destined to an AP (uplink) or to an STA (downlink) |
| MU indication | 1 | Indicating whether a PPDU is an SU-MIMO PPDU or an MU-MIMO PPDU |
| Guard Interval (GI) indication | 1 | Indicating whether a short GI or a long GI is used |
| Allocation information | 12 | Indicating a band or a channel (subchannel index or subband index) allocated to each STA in a bandwidth in which a PPDU is transmitted |
| Transmission power | 12 | Indicating a transmission power for each channel or each STA |

The HE-STF may be used to improve AGC estimation in MIMO transmission. The HE-LTF may be used to estimate an MIMO channel.

The HE-SIG B may include user-specific information that is required for each STA to receive its own data (i.e., a Physical Layer Service Data Unit (PSDU)). The HE-SIG B may be transmitted in one or two OFDM symbols. For example, the HE-SIG B may include information about the length of a corresponding PSDU and the Modulation and Coding Scheme (MCS) of the corresponding PSDU.

The L-STF, the L-LTF, the L-SIG, and the HE-SIG A may be duplicately transmitted in a unit of 20 MHz channel. For example, when a PPDU is transmitted through four 20 MHz channels, the L-STF, the L-LTF, L-STG and the HE-SIG A are duplicately transmitted every 20 MHz channel.

An FFT size per unit frequency may be further increased from the HE-STF (or from the HE-SIG A). For example, 256 FFT may be used in a 20 MHz channel, 512 FFT may be used in a 40 MHz channel, and 1024 FFT may be used in an 80 MHz channel. If the FFT size is increased, the number of OFDM subcarriers per unit frequency is increased because spacing between OFDM subcarriers is reduced, but an OFDM symbol time may be increased. In order to improve efficiency, the length of a GI after the HE-STF may be configured to be the same as that of the GI of the HE-SIG A.

Figure 3:
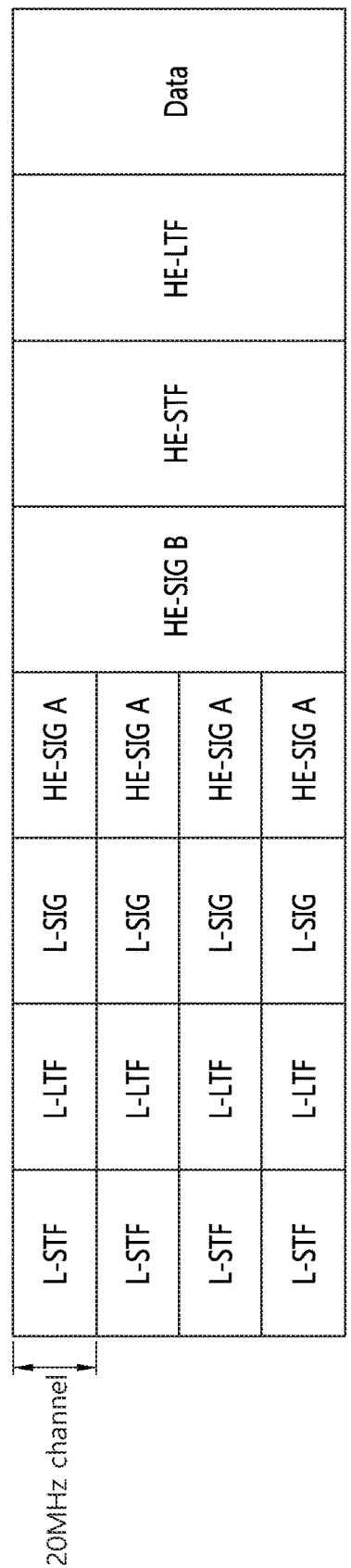
FIG. 3 illustrates another example of a proposed PPDU format for a WLAN.

FIG. 3 illustrates another example of a proposed PPDU format for a WLAN.

The PPDU formation is the same as that of FIG. 2 except that the HE-SIG B is placed behind the HE-SIG A. An FFT size per unit frequency may be further increased after the HE-STF (or the HE-SIG B).

FIG. 4 illustrates yet another example of a proposed PPDU format for a WLAN.

An HE-SIG B is placed behind an HE-SIG A. 20 MHz channels are allocated to different STAs (e.g., an STA1, an STA2, an STA3, and an STA4). The HE-SIG B includes information specific to each STA, but is encoded over the entire band. That is, the HE-SIG B may be received by all the STAs. An FFT size per unit frequency may be further increased after the HE-STF (or the HE-SIG B).

If the FFT size is increased, a legacy STA supports conventional IEEE 802.11a/g/n/ac is unable to decode a corresponding PPDU. For coexistence between a legacy STA and an HE STA, an L-STF, an L-LTF, and an L-SIG are transmitted through 64 FFT in a 20 MHz channel so that they can be received by a conventional STA. For example, the L-SIG may occupy a single OFDM symbol, a single OFDM symbol time may be 4 us, and a GI may be 0.8 us.

The HE-SIG A includes information that is required for an HE STA to decode an HE PPDU, but may be transmitted through 64 FFT in a 20 MHz channel so that it may be received by both a legacy STA and an HE STA. The reason for this is that an HE STA is capable of receiving conventional HT/VHT PPDUs in addition to an HE PPDU. In this case, it is required that a legacy STA and an HE STA distinguish an HE PPDU from an HT/VHT PPDU, and vice versa.

Figure 5:
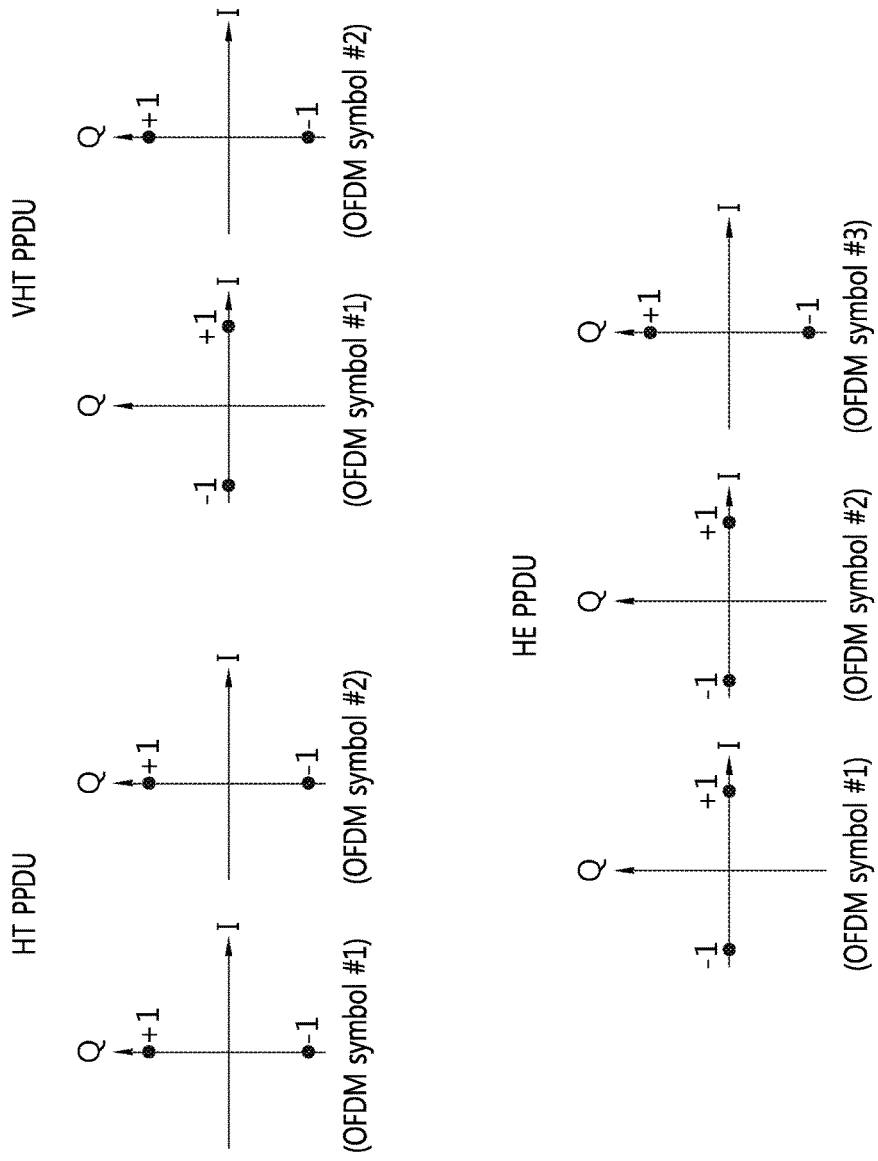
FIG. 5 illustrates an example of phase rotation for the classification of PPDUs.

FIG. 5 illustrates an example of phase rotation for the classification of PPDUs For the classification of PPDUs, the phase of the constellation of OFDM symbols transmitted after an L-STF, an L-LTF, and an L-SIG is used.

An OFDM symbol#1 is a first OFDM symbol after an L-SIG, an OFDM symbol#2 is an OFDM symbol subsequent to the OFDM symbol#1, and an OFDM symbol#3 is an OFDM symbol subsequent to the OFDM symbol#2.

In a non-HT PPDU, the phases of constellations used in the first OFDM symbol and the second OFDM symbol are the same. Binary Phase Shift Keying (BPSK) is used in both the first OFDM symbol and the second OFDM symbol.

In an HT PPDU, the phases of constellations used in the OFDM symbol#1 and the OFDM symbol#2 are the same and are counterclockwise rotated by 90 degrees. A modulation scheme having a constellation rotated by 90 degrees is called Quadrature Binary Phase Shift Keying (QBPSK).

In a VHT PPDU, the phase of a constellation used in the OFDM symbol#1 is not rotated, but the phase of a constellation used in the OFDM symbol#2 is counterclockwise rotated by 90 degrees like in the HT PPDU. The OFDM symbol#1 and the OFDM symbol#2 are used to send a VHT-SIG A because the VHT-SIG A is transmitted after the L-SIG and transmitted in the second OFDM symbol.

For the classification of HT/VHT PPDUs, the phases of three OFDM symbols transmitted after the L-SIG may be used in an HE-PPDU. The phases of the OFDM symbol#1 and the OFDM symbol#2 are not rotated, but the phase of the OFDM symbol#3 is counterclockwise rotated by 90 degrees. BPSK modulation is used in the OFDM symbol#1 and the OFDM symbol #2, and QBPSK modulation is used in the OFDM symbol#3.

If the HE-SIG A is transmitted in three OFDM symbols after the L-SIG, it may be said that all the OFDM symbols #1/#2/#3 are used to send the HE-SIG A.

Hereinafter, the proposed method for allocating resources in the wireless system will be described.

The users' demand for the evolution of the wireless LAN system as well as a high throughput and enhanced QoE (quality of experience) is constantly increasing.

In the conventional wireless LAN system, only one STA was able to use a channel within a frequency of the same BSS (Basic Service Set). Most particularly, extension could only be carried out by using neighboring frequency bands including a primary channel.

The HE system is considering the adoption of OFDMA (orthogonal frequency division multiple access). Since multiple STAs are capable of accessing multiple subbands at the same time, the frequency efficiency may be enhanced.

In the following description, a subband or subchannel refers to a bandwidth having a resource unit that can be allocated to each STA or a smallest unit that can be supported.

When applying the OFDMA method, the STA may simultaneously scan the entire subbands and may detect a subband (e.g., idle subband) that can be used by the corresponding subband. Unlike the conventional wireless LAN, which was capable of extending a usable bandwidth by simply aggregating (or combining) consecutive channels, the OFDMA-based system may transmit and receive data by using a plurality of non-contiguous (or non-consecutive) subbands.

When allocating a channel in the conventional wireless LAN, the allocation of a subband unit was not considered. This signifies that a guard tone is not defined as a subband unit. Subcarriers on both end of the allocated channel (i.e., right most and left most subcarriers) were used as the guard tone. When an OFDMA-based HE STA and a legacy STA access the channel at the same time, interference may occur.

Figure 6:
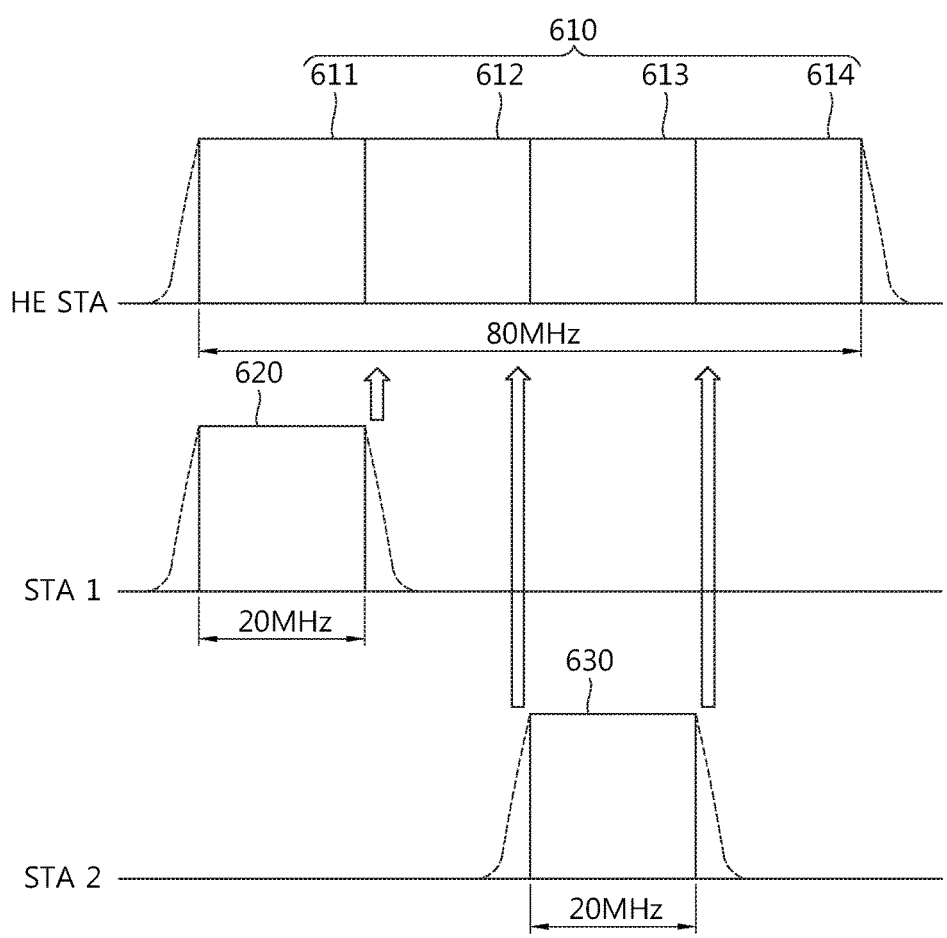
FIG. 6 is a diagram showing interference in a situation of coexistence of users each having a different bandwidth.

FIG. 6 is a diagram showing interference in a situation of coexistence of users each having a different bandwidth.

STA1 uses a 20 MHz channel 620, and STA2 also uses a 20 MHz channel 630. It will be assumed that the HE STA uses a 80 MHz channel 610. If HE STA, STA1, and STA2 uses the corresponding channel at the same time, due to a band emission of STA1 and STA2, the interference may influence a spectrum of the HE STA.

For example, it is given that the 80 MHz channel 610 of the HE STA is divided into 4 subbands 611, 612, 613, and 614 and that the second subband 612 is allocated to the HE STA. If the HE STA transmits a first PPDU from the second subband 612, and if STA1 transmits a second PPDU from the 20 MHz channel 620, interference may occur due to partial overlapping of a side lobe of the 20 MHz channel 620 transmission and part of the second subband.

In order to be capable of using a wider bandwidth with the mitigation of the interference, a method for allocating resources according to an exemplary embodiment of the present invention will hereinafter be described.

A SBW (subband bandwidth) refers to a bandwidth of a subband. A TBW (total bandwidth) refers to a total bandwidth of multiple subbands. A TBW may correspond to 160 MHz, 80 MHz, 40 MHz, or 20 MHz. A SBW may correspond to 80 MHz, 40 MHz, 20 MHz, 10 MHz, 5 MHz, or 1 MHz. Hereinafter, an exemplary case when the TBW corresponds to 80 MHz and when the SBW corresponds to 20 MHz will be described. In an environment where multiple BSSs co-exist, the SBW may correspond to the bandwidth of the smallest subband.

A guard tone corresponds to a subcarrier that is not used for the purpose of preventing interference. Herein, the guard tone is also referred to as an unused subbcarrier, a null subcarrier, and a guard subcarrier. And, a group of one or more consecutive guard tones is referred to as a guard region.

Figure 7:
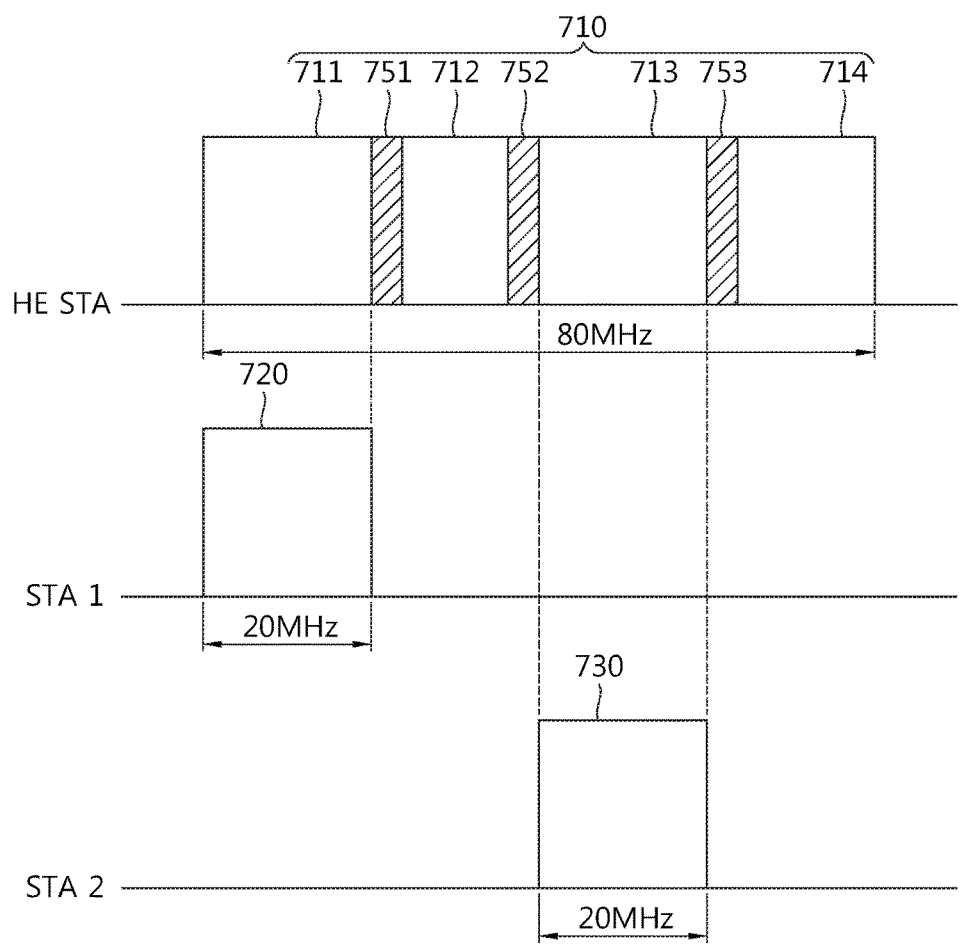
FIG. 7 is a diagram showing a resource allocation method according to an exemplary embodiment of the present invention.

FIG. 7 is a diagram showing a resource allocation method according to an exemplary embodiment of the present invention.

A 80 MHz channel 710 includes 4 subbands 711, 712, 713, and 714, and a guard region is defined on each end. According to an exemplary embodiment, additional guard regions 751, 752, and 753 may be defined in mid-portions of the 80 MHz channel 710.

The additional guard regions 751, 752, and 753 may be positioned in locations for reducing the interference caused by the transmission from subbands 720 and 730 of another STA.

More specifically, the additional guard regions 751, 752, and 753 may be defined in-between the multiple subbands 711, 712, 713, and 714. A first guard region 751 may be defined between the first subband 711 and the second subband 712, a second guard region 752 may be defined between the second subband 712 and the third subband 713, and a third guard region 753 may be defined between the third subband 713 and the fourth subband 714.

One of two ends of the guard regions 751, 752, and 753 may be matched (or paired) with the right most index or the left most index of the subbands 711, 712, 713, and 714. For example, as shown in FIG. 7, in order to prevent interference caused by a side lobe of the 20 MHz channel 720, the first guard region 751 may start from the right most end of the 20 MHz channel 720. Similarly, the second guard region 752 may end at the left most end of the 20 MHz channel 730, and the third guard region 753 may start from the right most end of the 20 MHz channel 730.

According to the proposed exemplary embodiment, a guard region may be respectively positioned on both ends of the subbands 711, 712, 713, and 714.

The guard region includes one or more guard subcarriers having no data allocated thereto. Among the entire subcarriers within the TBW, with the exception for data subcarriers, a number of guard subcarriers within each guard region may be allocated as equally as possible.

For example, when the TBW corresponds to 80 MHz, and when 256 FFT is used, the total number of subcarriers is equal to 256. If the number of guard subcarriers on both ends of the TBW is equal to 11, 245 subcarriers remain. For example, as shown in FIG. 7, when it is given that three guard regions 751, 752, and 753 are defined, the number of guard subcarriers in each of the first guard region 751 and the third guard region 753 may be equal to 6, and the number of guard subcarriers in the second guard region 752 may be equal to 9. The number of data subcarriers in each of the subbands 711, 712, 713, and 714 is equal to 56. Thus, 56*4+6+6+9=245. The guard region structure for TBW 160 MHz may be configured by applying a repetition of the structure for TBW 80 MHz.

In the exemplary embodiment presented above, it is assumed that IDFT (inverse Discrete Fourier transform) according to one FFT size is applied to the HE PPDU. As described above, the HE PPDU may be generated by applying IDFT according to different FFT sizes. The HE PPDU includes a first part having a first FFT size applied thereto (e.g., L-STF, L-LTF, and L-SIG) and a second part having a second FFT size applied thereto (e.g., HE-STF, HE-LTF, and a data field). For example, the second FFT size may be equal to N times (wherein N>1) the first FFT size.

If N=4, TBW corresponds to 80 MHz, and the second part to which N-time FFT is applied uses 1024 FFT. The total number of subcarriers is equal to 1024. If the number of guard subcarriers on both ends of the TBW is equal to 11, 1013 subcarriers remain. For example, as shown in FIG. 7, when it is given that three guard regions 751, 752, and 753 are defined, the number of guard subcarriers in each of the first guard region 751 and the third guard region 753 may be equal to 14, and the number of guard subcarriers in the second guard region 752 may be equal to 17. The number of data subcarriers in each of the subbands 711, 712, 713, and 714 is equal to 242. Thus, 242*4+14+14+17=1013. The guard region structure for TBW 160 MHz may be configured by applying a repetition of the structure for TBW 80 MHz.

Just as in FIG. 7, each frequency index of the subband is matched with (or paired with) the right most or left most frequency index. Therefore, the size of the subband of the TBW may be configured identically as the SBW. If 4-time FFT is applied, the number of subcarriers included in each subband in is increased to 4 times.

If N-times FFT is applied to the PPDU, since this signifies that the number of tones has been scalably increased from the conventional FFT subcarrier tone, regardless of whether N-times FFT has been applied to the SBW, the N-times FFT may be respectively applied to the frequency positions where each of the subbands begins and ends and to the frequency positions where the guard region begins and ends. Even if N-times FFT is applied to the TBW and 1xFFT is applied to the SBW, with the exception for the difference in the frequency index, the frequency positions where the subbands and guard regions begin and end may be aligned alongside one another and then matched. just as the subcarrier spacing of 1xFFT is configured to be equal to 312.5 kHz and the subcarrier spacing of N-times FFT is configured to be equal to 78.125 kHz, this may be applied when the subcarrier spacing of 1xFFT is configured to be equal to N-times the subcarrier spacing of N-times FFT.

Figure 8:
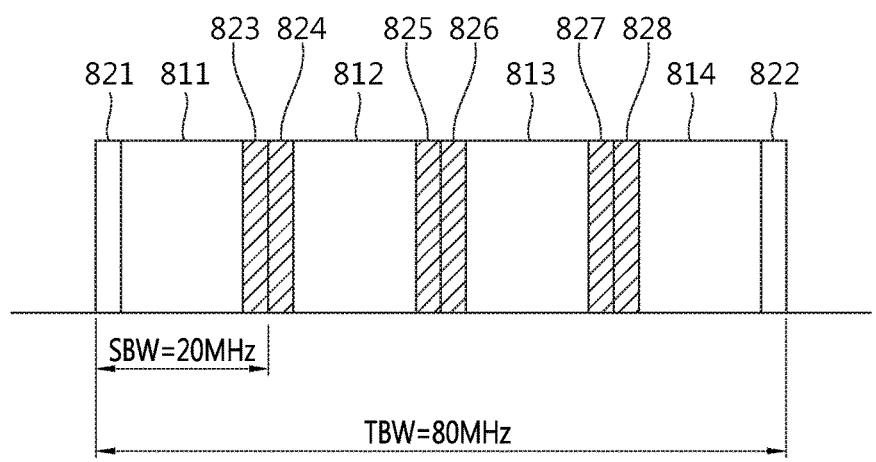
FIG. 8 illustrates an example for configuring a guard region, when TBW=80 MHz and SBW=20 MHz.

FIG. 8 illustrates an example for configuring a guard region, when TBW=80 MHz and SBW=20 MHz.

(1) When 1xFFT is Applied

Pre-defined guard regions 821 and 822 exist on both right most and left most subcarriers of the TBW. A first guard region 823 is positioned on a right most side of the first subband 811. A second guard region 824 is positioned on a left most side of the second subband 812. And, a third guard region 825 is positioned on a right most side of the second subband 812. A fourth guard region 826 is positioned on a left most side of the third subband 813. A fifth guard region 827 is positioned on a right most side of the third subband 813. A sixth guard region 828 is positioned on a left side most of the fourth subband 814. The first guard region 823 may include 3 guard subcarriers, the second guard region 824 may include 3 guard subcarriers, the third guard region 825 may include 5 guard subcarriers, the fourth guard region 826 may include 4 guard subcarriers, the fifth guard region 827 may include 3 guard subcarriers, and the sixth guard region 828 may include 3 guard subcarriers.

(2) When 4xFFT is Applied

The positions of the first guard region 823 to the sixth guard regions 828 are the same as the case when 1xFFT is applied. The first guard region 823 may include 7 guard subcarriers, the second guard region 824 may include 7 guard subcarriers, the third guard region 825 may include 9 guard subcarriers, the fourth guard region 826 may include 8 guard subcarriers, the fifth guard region 827 may include 7 guard subcarriers, and the sixth guard region 828 may include 7 guard subcarriers.

Figure 9:
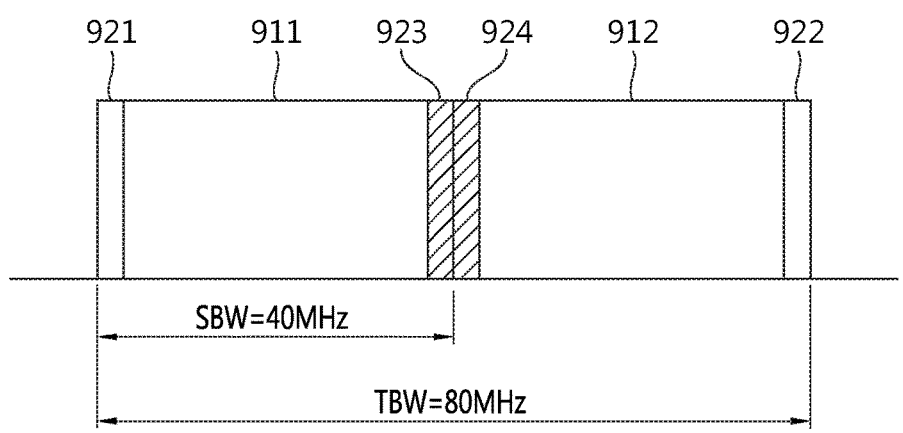
FIG. 9 illustrates an example for configuring a guard region, when TBW=80 MHz and SBW=40 MHz.

FIG. 9 illustrates an example for configuring a guard region, when TBW=80 MHz and SBW=40 MHz.

(1) When 1xFFT is Applied

Pre-defined guard regions 921 and 922 exist on both right most and left most subcarriers of the TBW. A first guard region 923 is positioned on a right most side of the first subband 911. A second guard region 924 is positioned on a left most side of the second subband 912. The first guard region 923 may include 15 guard subcarriers, and the second guard region 924 may include 14 guard subcarriers.

(2) When 4xFFT is Applied

The positions of the first guard region 923 and second guard region 924 are the same as the case when 1xFFT is applied. The first guard region 923 may include 9 guard subcarriers, and the second guard region 924 may include 8 guard subcarriers.

Figure 10:
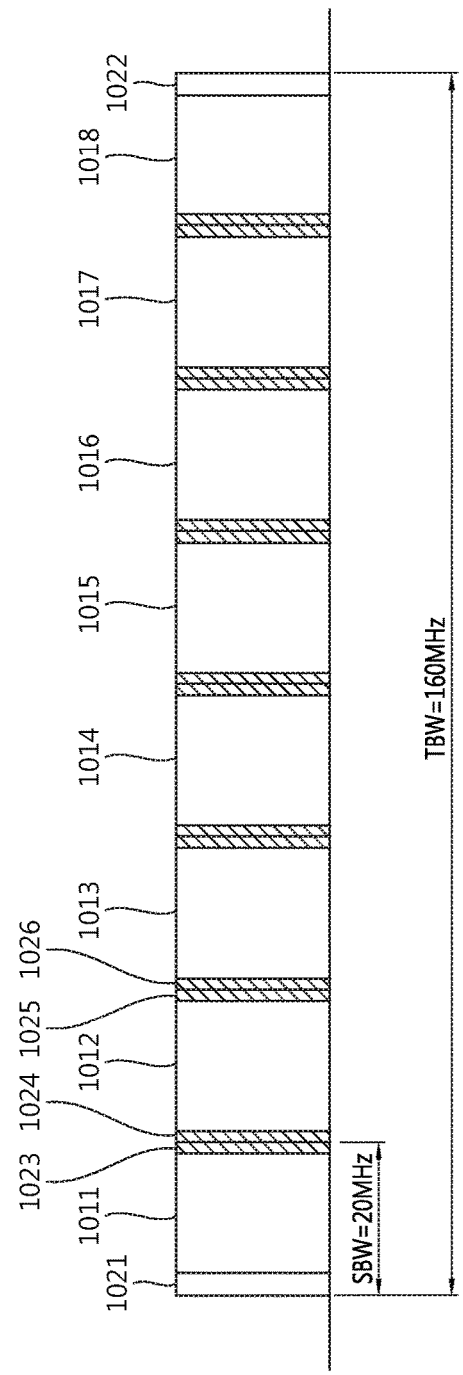
FIG. 10 illustrates an example for configuring a guard region, when TBW=160 MHz and SBW=20 MHz.

FIG. 10 illustrates an example for configuring a guard region, when TBW=160 MHz and SBW=20 MHz.

The allocation respective to the case when TBW=80 MHz and SBW=20 MHz, which is described above in FIG. 8, may be repeated two times. Pre-defined guard regions 1021 and 1022 exist on both right most and left most subcarriers of the TBW. A first guard region 1023 is positioned on a right most side of the first subband 1011. A second guard region 1024 is positioned on a left most side of the second subband 1012. The remaining guard regions are also the same as described above.

Figure 11:
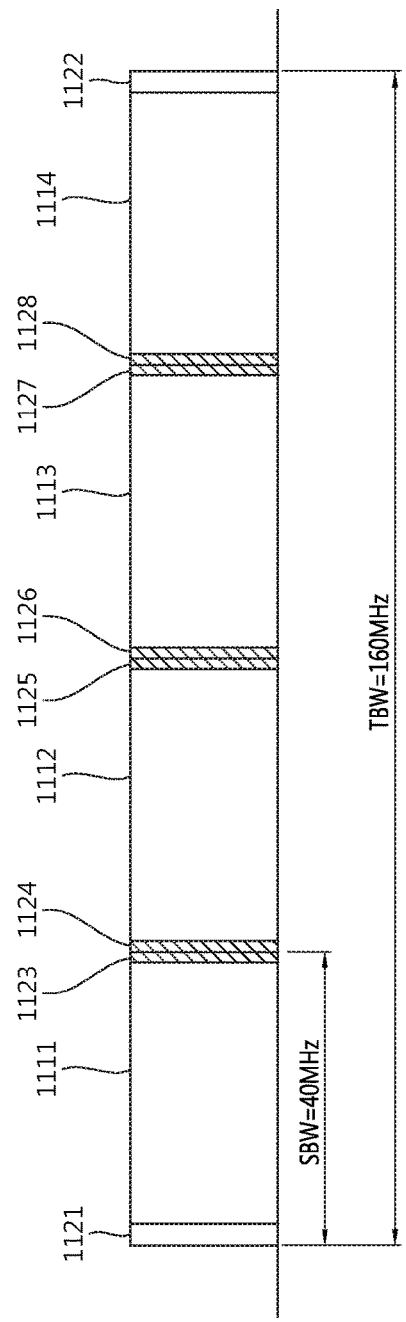
FIG. 11 illustrates an example for configuring a guard region, when TBW=160 MHz and SBW=40 MHz.

FIG. 11 illustrates an example for configuring a guard region, when TBW=160 MHz and SBW=40 MHz.

The allocation respective to the case when TBW=80 MHz and SBW=40 MHz, which is described above in FIG. 9, may be repeated two times. Pre-defined guard regions 1121 and 1122 exist on both right most and left most subcarriers of the TBW. A first guard region 1123 is positioned on a right most side of the first subband 1111. A second guard region 1124 is positioned on a left most side of the second subband 1112. The remaining guard regions are also the same as described above.

Apart from the TBW/SBW combination of FIG. 8 to FIG. 11, the guard regions may be defined in-between subbands with respect to diverse TBW/SBW combinations.

If guard regions are defined in-between the subbands, performance degradation caused by interference in an environment where diverse bandwidths co-exist may be reduced. However, due to an increase in the guard subcarriers, data subcarriers may be decreased, thereby causing a decrease in the throughput. Therefore, guard region configurations may be varied in accordance with the environment. For example, in a BSS where OFDMA is configured, the proposed guard regions are defined, and, in a BBS where OFDMA is not configured, guard regions may not be defined. Alternatively, in an environment where diverse TBW/SBW combinations exist between neighboring BSSs, guard regions are defined, and guard regions may not be defined between BSSs in which only specific TBWs using the entire band for communication exist.

Figure 12:
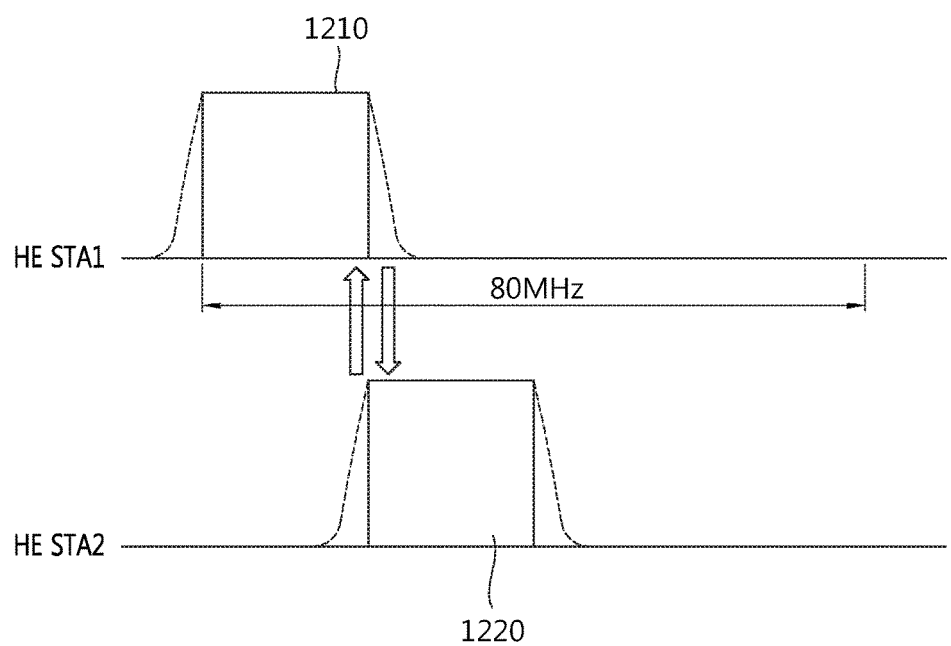
FIG. 12 illustrates an example of interference between subbands.

FIG. 12 illustrates an example of interference between subbands. This shows an example of inter-HE STA interference using multiple subbands.

Although both HE STA1 and HE STA2 use the same 80 MHz band, it will be assumed herein that HE STA1 uses a first subband 1210 and that HE STA2 uses a second subband 1220.

Since the wireless LAN performs channel access based on CCA (clear channel assessment), as long as the CCA threshold condition is satisfied, the wireless LAN may use a channel or subband that is not used by other STAs. Herein, it will be assumed that HE STA1 transmits a first OFDMA packet (e.g., PPDU) through the first subband 1210, and that HE STA2 transmits a second OFDMA packet through the second subband 1220. Since the first subband 1210 and the second subband 1220 are adjacent to one another, interference may occur from the side lobe of each subband.

Therefore, if a guard region is respectively defined at the right most side of the first subband 1210 and/or the left most side of the second subband 1220, interference may be mitigated.

Figure 13:
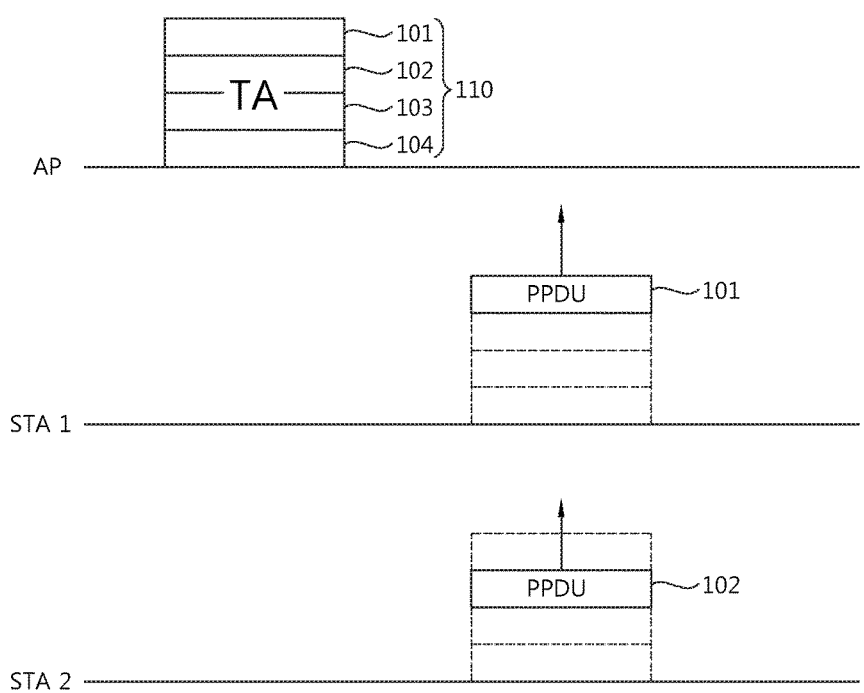
FIG. 13 is a block diagram showing a method for transmitting data according to an exemplary embodiment of the present invention.

FIG. 13 is a block diagram showing a method for transmitting data according to an exemplary embodiment of the present invention.

TBW 110 includes four subbands 101, 102, 103, and 104. Guard regions according to the above-described exemplary embodiment may be defined between the subbands 101, 102, 103, and 104.

The AP transmits a transmission allocation (TA) message from the TBW 110. The TA message may be transmitted from at least one of the four subbands.

The TA message may include at least one of identification information identifying STA1 and STA2 indicating UL transmission, synchronization information for UL transmission (or transport) sections and UL transmission, and allocation information indicating the subband being allocated to each STA.

It will be assumed that a first subband 101 is allocated to STA1 and that a second subband 102 is allocated to STA2. STA1 may transmit a first PPDU through the first subband 101, and STA2 may transmit a second PPDU through the second subband 102. And, interference may be mitigated through the guard regions. The AP may transmit ACKs respective to the received PPDUs to STA1 and STA2.

Figure 14:
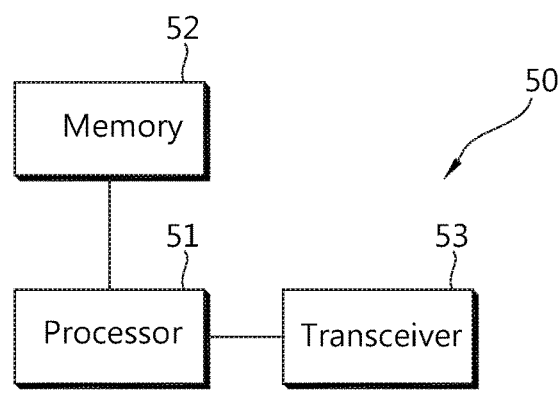
FIG. 14 is a block diagram illustrating a wireless device in which an embodiment of the present invention is implemented.

FIG. 14 is a block diagram illustrating a wireless device in which an embodiment of the present invention is implemented.

A device 50 includes a processor 51, memory 52, and a transceiver 53. The wireless device may be an AP or a non-AP STA in the aforementioned embodiments. The transceiver 53 is connected to the processor 51 and sends and/or receives radio signals. The processor 51 implements the proposed functions, processes and/or methods. The operation of an AP or a non-AP STA in the aforementioned embodiments may be implemented by the processor 51. The memory 52 is connected to the processor 51 and may store instructions for implementing the operation of the processor 51.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting data in a wireless LAN, the method comprising:
receiving, by a transmitter, allocation information for at least one subband of a plurality of subbands from an access point (AP);
generating a Physical layer Protocol Data Unit (PPDU) based on a fast Fourier transform (FFT) size; and
transmitting, by the transmitter, the PPDU in the at least one allocated subband,
wherein each of the plurality of subbands has guard regions defined at both ends of the subband,
wherein frequency positions of guard subcarriers at which the guard regions start and end are fixed regardless of the FFT size,
wherein frequency positions of subband subcarriers at which each of the plurality of subbands starts and ends are fixed regardless of the FFT size, and
wherein the FFT size is 256 FFT or 1024 FFT.

2. The method of claim 1, wherein a number of the guard subcarriers included in the guard region varies in accordance with the FFT size.

3. The method of claim 1, wherein the PPDU includes a first part to which the 256 FFT is applied and a second part to which the 1024 FFT is applied.

4. The method of claim 3, wherein the guard regions are defined by a frequency band through which the second part is transmitted.

5. The method of claim 3, wherein the first part includes information indicating the at least one allocated subband through which the PPDU is transmitted.

6. The method of claim 1,
wherein when the FFT size is 256 FFT, an interval of the guard subcarriers and an interval of the subband subcarriers are 312.5 KHz, and
wherein when the FFT size is 1024 FFT, the interval of the guard subcarriers and the interval of the subband subcarriers are 78.125 KHz.

7. An apparatus for transmitting data in a wireless LAN, the apparatus comprising:
a transceiver that transmits and receives radio signals; and
a processor being connected to the transceiver,
wherein the processor is configured to:
receive allocation information for at least one subband of a plurality of subbands from an access point (AP) through the transceiver;
generate a Physical layer Protocol Data Unit (PPDU) based on a fast Fourier transform (FFT) size; and
transmit the PPDU in the at least one allocated subband through the transceiver,
wherein each of the plurality of subbands has guard regions defined at both ends of the subband,
wherein frequency positions of guard subcarriers at which the guard regions start and end are fixed regardless of the FFT size,
wherein frequency positions of subband subcarriers at which each of the plurality of subbands starts and ends are fixed regardless of the FFT size, and
wherein the FFT size is 256 FFT or 1024 FFT.

8. The apparatus of claim 7, wherein a number of the guard subcarriers included in the guard region varies in accordance with the FFT size.

9. The apparatus of claim 7, wherein the PPDU includes a first part to which the 256 FFT is applied and a second part to which the 1024 FFT is applied.

10. The apparatus of claim 9, wherein the guard regions are defined by a frequency band through which the second part is transmitted.

11. The apparatus of claim 9, wherein the first part includes information indicating the at least one allocated subband through which the PPDU is transmitted.

12. The apparatus of claim 7,
wherein when the FFT size is 256 FFT, an interval of the guard subcarriers and an interval of the subband subcarriers are 312.5 KHz, and
wherein when the FFT size is 1024 FFT, the interval of the guard subcarriers and the interval of the subband subcarriers are 78.125 KHz.

* * * * *